United States Patent [19]

Straub

[11] Patent Number: 5,108,067
[45] Date of Patent: Apr. 28, 1992

[54] DIAPHRAGM VALVE WITH AN ELASTIC DIAPHRAGM BRACED BY A VALVE COVER

[76] Inventor: Hartwig Straub, Gansäckerstrasse, D-6965 Ahorn-Berolzheim, Fed. Rep. of Germany

[21] Appl. No.: 477,920
[22] PCT Filed: Nov. 3, 1989
[86] PCT No.: PCT/DE89/00698
    § 371 Date: Jul. 16, 1990
    § 102(e) Date: Jul. 16, 1990
[87] PCT Pub. No.: WO90/05261
    PCT Pub. Date: May 17, 1990

[30] Foreign Application Priority Data
    Nov. 3, 1988 [DE] Fed. Rep. of Germany ....... 3837366

[51] Int. Cl.[5] .............................................. F16K 31/365
[52] U.S. Cl. ..................................... 251/45; 251/61.1
[58] Field of Search ............... 251/45, 46, 30.05, 61.1, 251/331, 30.01

[56] References Cited

U.S. PATENT DOCUMENTS

| | | |
|---|---|---|
| 2,882,929 | 4/1959 | Churchill . |
| 3,022,039 | 2/1962 | Cone . |
| 3,495,803 | 2/1970 | Schoepe .............. 251/61.1 X |
| 3,763,881 | 10/1973 | Jones ................... 251/45 X |
| 3,889,711 | 6/1975 | Hiaro ................. 251/61.1 X |
| 4,244,554 | 1/1981 | DiMauro . |
| 4,295,488 | 10/1981 | Book ................. 251/30.05 X |
| 4,561,627 | 12/1985 | Meckstroth ............ 251/45 X |
| 4,721,133 | 1/1988 | Sundblom ............ 251/61.1 X |
| 4,848,722 | 7/1989 | Webster ................ 251/61.1 |
| 4,860,990 | 8/1989 | Fukuzawa ........... 251/30.05 X |

FOREIGN PATENT DOCUMENTS 1186275 2/1959 France .
72694 4/1960 France .

Primary Examiner—Alan Cohan
Attorney, Agent, or Firm—Banner, Birch, McKie & Beckett

[57] ABSTRACT

Diaphragm valve with an elastic diaphragm, which is penetrated by at least one balance hole, braced sealingly on the side of the rim by a valve cover, and which closes a pressure vessel and can be moved by setting the pressure on both sides between the valve cover and the mouthpiece of an exhaust pipe; in the closed state said diaphragm valves abuts the mouthpiece sealingly and in the opened state is bent due to the excess pressure on its side toward the valve cover facing away from the valve cover, wherein in the opened state a hole, opposite the diaphragm, in the valve cover is opened by a control valve and is closed in the closed state so that the pressure in the pressure vessel acts on one side of the diaphragm only when the control valve is open and lifts said diaphragm from the moutpiece. The valve cover on its side facing the diaphragm is designed as a substantially flat plate and the diaphragm is provided on its side facing the valve cover with a projection arranged coaxially to the mouthpiece, around which projection the diaphragm bends or straightens when opening and closing.

3 Claims, 2 Drawing Sheets

DIAPHRAGM VALVE WITH AN ELASTIC DIAPHRAGM BRACED BY A VALVE COVER

The invention relates to a diaphragm valve with an elastic diaphragm, which is penetrated by at least one balance hole, braced sealingly on the side of the rim by a valve cover, and which closes a pressure vessel and can be moved by setting the pressure on both sides between the valve cover and the mouthpiece of an exhaust pipe; in the closed state said diaphragm valve abuts the mouthpiece sealingly and in the opened state is bent due to the excess pressure on its side toward the valve cover facing away from the valve cover, wherein in the opened state a hole, opposite the diaphragm, in the valve cover is opened by a control valve and is closed in the closed state so that the pressure in the pressure vessel acts on one side of the diaphragm only when the control valve is open and lifts said diaphragm from the mouthpiece.

Such a diaphragm valve is known from DE OS 33 03 003. To give the diaphragm of this diaphragm valve adequate play, the valve cover has a recess which encloses the hole in the valve cover and passes over into a prominence that extends like a ring relative to the valve cover surface adjoining it. This annular prominence on the valve cover pushes in the closed state of the diaphragm valve the diaphragm against the mouthpiece of the exhaust pipe, whereas in the opened state due to the hole in the valve cover that is opened by the control valve the pressure in the pressure vessel pushes the diaphragm into the recess, thus lifting the diaphragm from the mouthpiece.

The invention is based on the problem of simplifying the construction of the diaphragm valve under discussion, which must be addressed as a mass-produced article. This problem is solved by the invention in that the valve cover is designed on its side facing the diaphragm as a substantially flat plate and the diaphragm on its side facing the valve cover is provided with a projection arranged coaxially to the mouthpiece, around which projection the diaphragm bends or straightens out when opening and closing.

Since the diaphragm is designed with the coaxial projection, the clearance of motion to be given to the diaphragm is shifted away from the valve cover so that the valve cover can be designed as a flat plate, a feature which represents a significant simplification of the design of this part. The special design of the diaphragm does not play a role, since this diaphragm is a moulded part made of an elastic plastic or rubber that is to be extruded or vulcanized in the typical manner and for whose manufacture an adapted shape is necessary in every case.

Various possible designs exist for the projection included in the diaphragm. Thus, the diaphragm can be provided on its side facing the valve cover with a projection around which the diaphragm bends or straightens out when opening and closing. In this case the projection forms simultaneously the seal of the diaphragm relative to the valve cover. However, it is also possible to design the projection in the shape of a collar so that due to the pot wall the result is a space between the actual diaphragm and the surface of the valve cover facing said diaphragm.

Preferably the diaphragm has in the region of the mouthpiece a reinforcement, wherein the region exploiting the elasticity of the diaphragm material is displaced outwardly radially away from the mouthpiece. In the region of the mouthpiece, the diaphragm can abut without bending and seal said mouthpiece.

Embodiments of the invention are shown in the figures.

Figure 1:
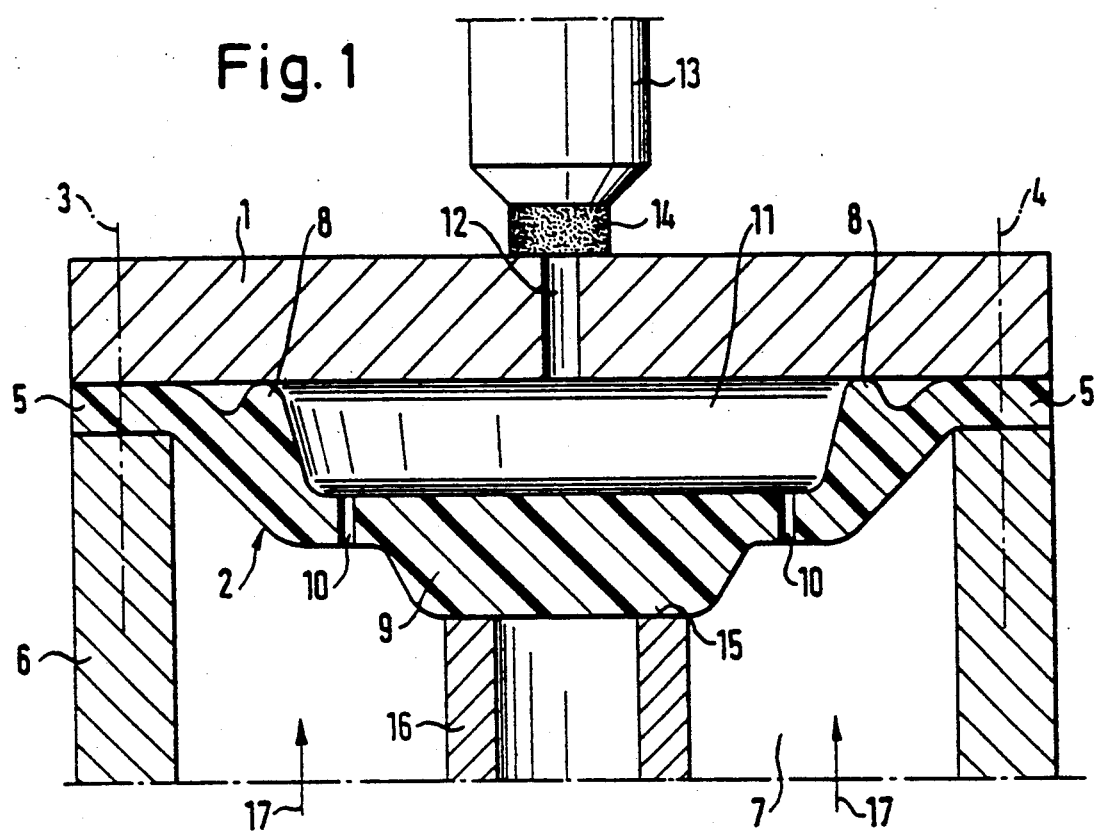
FIGS. 1 and 2 shows a diaphragm valve in which the diaphragm is provided with a torus, and in particular in the closed and opened state.

The diaphragm valve shown in FIG. 1 comprises valve cover 1 and elastic diaphragm 2, which is braced on the rim of valve cover 1 and fastened here by means of attachment elements, which are indicated by the dashed-dotted lines 3 and 4. It can also involve continuous screws, which penetrate rim 5 of diaphragm 2 and are screwed into the wall of a pressure vessel 6. Pressure vessel 6 is shown here only with its part facing the diaphragm valve; its interior is denoted as 7. In this manner it is achieved that in the region of rim 5 of diaphragm 2 the result is a seal both of pressure vessel 6 with respect to diaphragm 2 and also between this diaphragm and valve cover 1.

Diaphragm 2 is provided with torus 8, which projects from said diaphragm and is designed as one piece with diaphragm 2. In this case it involves a part extruded of elastic plastic or a part vulcanized of rubber. Diaphragm 2 is designed in its central region as a reinforcement 9, thus largely taking the elasticity from it in this region. In the region between reinforcement 9 and torus 8, diaphragm 2 has several balance holes 10, which make it possible for the pressure medium located in pressure vessel 6 to penetrate through balance hole 10 into interspace 11 between diaphragm 2 and valve cover 1.

Valve cover 1 has hole 12, which lies opposite diaphragm 2 and serves to form a connection from interspace 11 to the environment of the diaphragm valve depending on whether control valve 13 does or does not seal with its seal 14 hole 12.

FIG. 1 shows the diaphragm valve in the closed state in which diaphragm 2 abuts mouthpiece 15 of exhaust pipe 16. In this closed state control valve 13 seals with a seal 14, as shown, hole 12 so that the pressure indicated by arrow 17 can extend over balance bores 10 into interspace 11. Thus, the same pressure acts on both sides of diaphragm 2 so that, owing to an inherent prestress, which said diaphragm acquires through assembly, diaphragm 2 abuts sealingly mouthpiece 15 of exhaust pipe 16 and thus closes it. When assembling diaphragm 2, it is bent especially with its rim 5 around torus 8 in the direction of valve cover 1, thus resulting in a prestress in diaphragm 2 due to the elasticity of the diaphragm material, said prestress pushing, as stated, this diaphragm against mouthpiece 15 of exhaust pipe 16.

Figure 2:
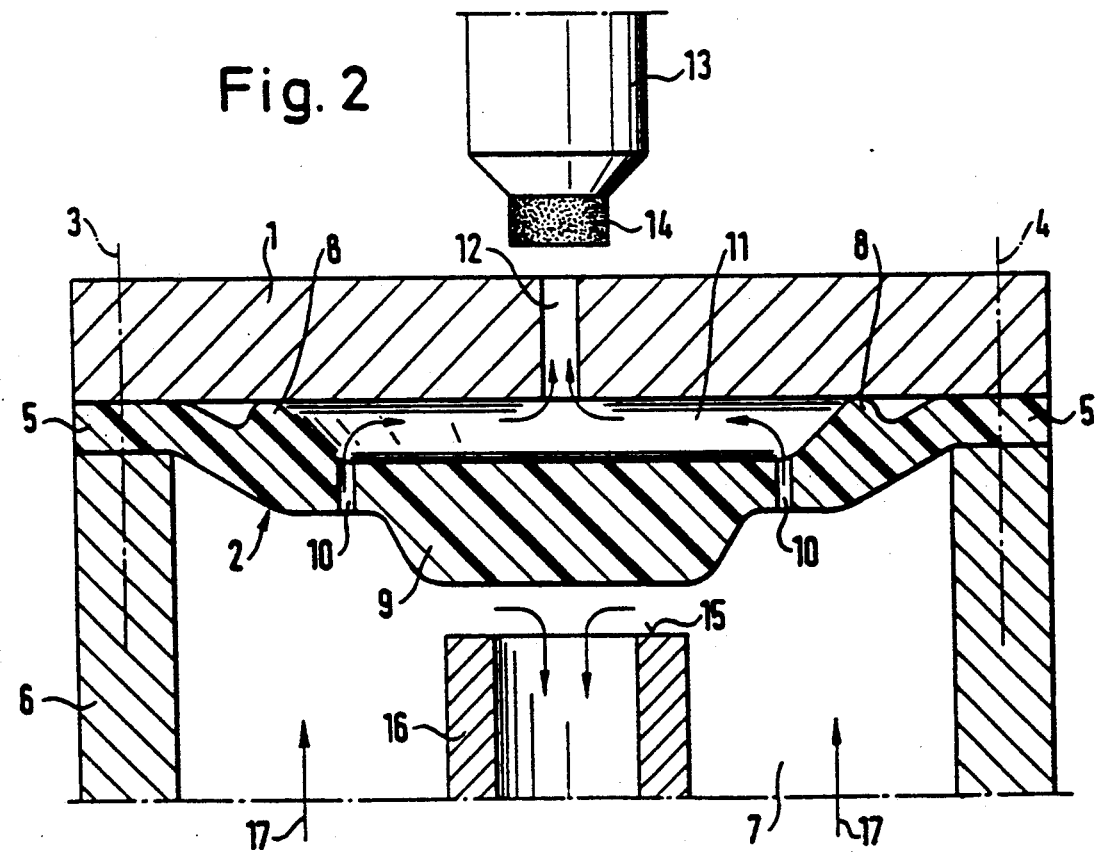

FIG. 2 shows the same diaphragm valve in the opened state. In this state the control valve 13 is lifted with its seal 14 from hole 12 so that the pressure from the interspace 11 can escape, according to the drawn arrow, in hole 12 to the environment. Due to the small cross-section of balance holes 10, this equalization of pressure on the way from interior 7 through balance holes 10 into interspace 11 and thereafter through hole 12 results in a pressure drop, which in pressure vessel 6 leads to excess pressure with respect to the pressure in interspace 11 so that diaphragm 2 bends under the effect of this excess pressure in the direction of valve cover 1.

At the same time diaphragm 2 is lifted from mouthpiece 15 of exhaust pipe 16, thus opening the diaphragm valve. When diaphragm 2 moves in this manner, this diaphragm continues to bend around torus 8, thus further increasing the prestress in diaphragm 2, which is, of course, balanced by the excess pressure acting on diaphragm 2 from interior 7. The cross-section of hole 12 which is substantially larger than the cross-section of balance holes 10 provides that, when control valve 13 is lifted, the pressure ratios responsible for lifting diaphragm 3 are maintained constantly on both sides of said diaphragm.

As apparent, valve cover 1 comprises only a flat plate on the side facing diaphragm 2, said plate being made in the typical manner of metal, in particular aluminum. Thus, it involves a component that is quite simple to manufacture.

Figure 3:
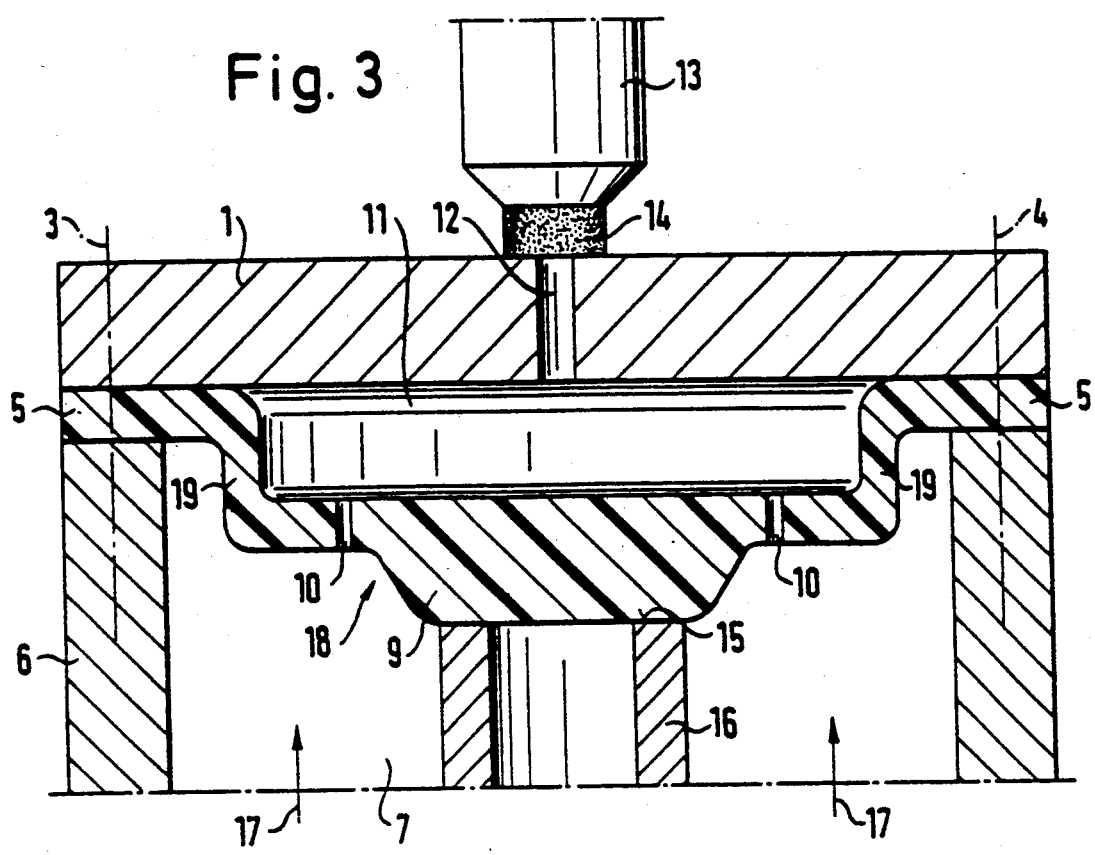
FIGS. 3 and 4 show a diaphragm valve with a diaphragm, which has a projection designed like a collar, and in particular also in the closed and opened state.
Figure 4:
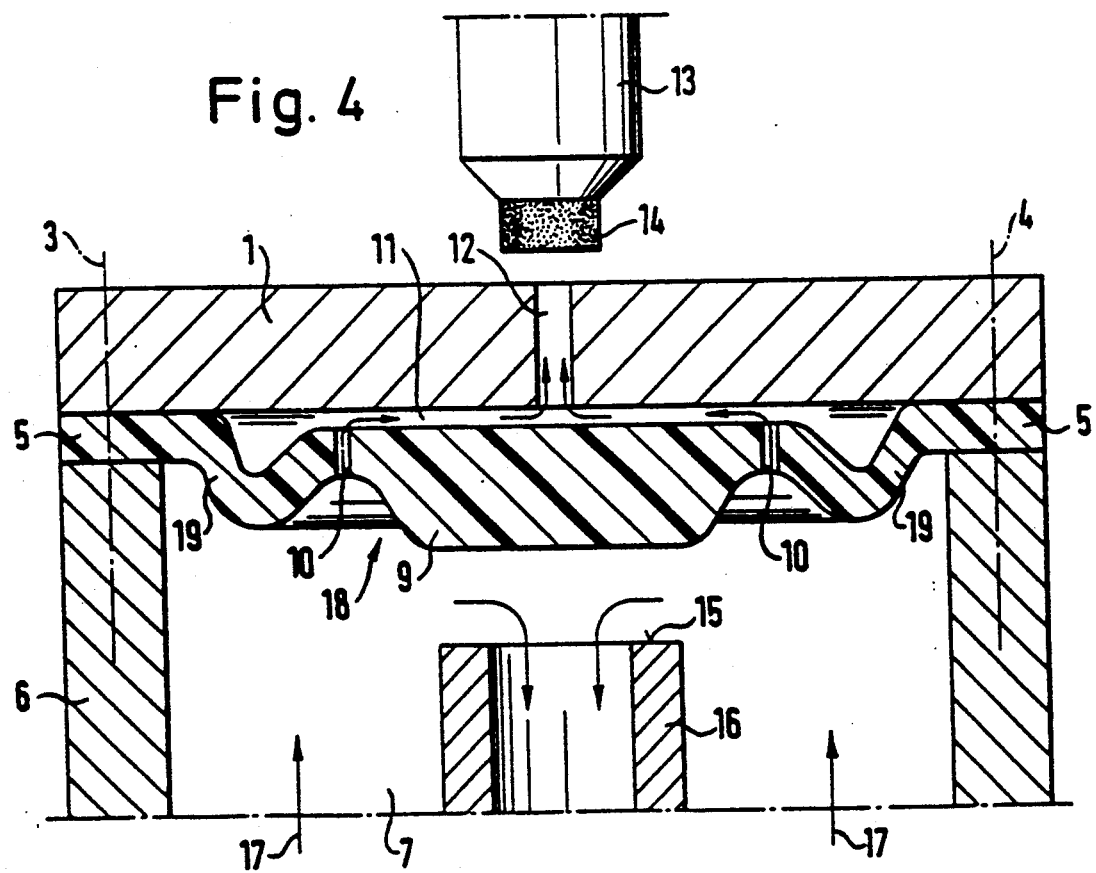

FIGS. 3 and 4 show a variation of the diaphragm shown in FIGS. 1 and 2. The other parts of the diaphragm valve are designed in the same manner as those of the embodiment of FIGS. 1 and 2 so that the same reference numerals can also be used. The function of the respective diaphragm valve is also the same in both cases.

The diaphragm valve of FIGS. 3 and 4 has here diaphragm 18, which in the region between reinforcement 9 and rim 5 has a collar-like annular part 19, which gives diaphragm 18 the requisite elasticity for raising it from exhaust pipe 16 and returning it on said exhaust pipe.

FIG. 3, which shows the closed position of the diaphragm valve, shows annular part 19 as stretched. FIG. 4, showing the opened position, shows annular part 19 as slipped over in which position it is held by the excess pressure on the side of the interior 7 against its inner prestress that has been generated as a result.

I claim:

1. Diaphragm valve with an elastic diaphragm (2), which is penetrated by at least one balance hole, braced sealingly on the side of the rim by a valve cover (1), and which closes a pressure vessel (6) and can be moved by setting the pressure on both sides between the valve cover (1) and the mouthpiece (15) of an exhaust pipe (16); in the closed state said diaphragm valve abuts the mouthpiece (15) sealingly and in the opened state is bent due to the excess pressure on its side toward the valve cover (1) facing away from the valve cover (1), wherein in the opened state a hole (12), opposite the diaphragm (2), in the valve cover (1) is opened by a control valve (13) and is closed in the closed state so that the pressure in the pressure valve (6) acts on one side of the diaphragm only when the control valve (13) is open and lifts said diaphragm from the mouthpiece (15), wherein the valve cover (1) is designed on its side facing the diaphragm (2) as a substantially flat plate and the diaphragm (2) on the side facing its valve cover (1) is provided with a projection (8) arranged coaxially to the mouthpiece (15), which projection (8) abuts against the valve cover (1) in such a way that the diaphragm (2) bends over the projection (8) when opening or straightens out when closing.

2. Diaphragm valve, as claimed in claim 1, wherein the projection is designed as a torus (8) projecting from the diaphragm (2).

3. Diaphragm valve, as claimed in any one of the claims 1-2, wherein the diaphragm (2, 18) in the region of the mouthpiece has a reforcement (9).

* * * * *